(12) United States Patent
Juranitch et al.

(10) Patent No.: US 11,073,049 B2
(45) Date of Patent: Jul. 27, 2021

(54) INDUCTIVE BATH PLASMA CUPOLA

(75) Inventors: James Charles Juranitch, Ft. Lauderdale, FL (US); Thomas Raymond Juranitch, Delray Beach, FL (US)

(73) Assignee: Plasma Tech Holdings, LLC, Bedford, NH (US)

( * ) Notice: Subject to any disclaimer, the term of this patent is extended or adjusted under 35 U.S.C. 154(b) by 0 days.

(21) Appl. No.: 13/984,835

(22) PCT Filed: Feb. 10, 2012

(86) PCT No.: PCT/US2012/024644
§ 371 (c)(1),
(2), (4) Date: Feb. 25, 2014

(87) PCT Pub. No.: WO2012/109537
PCT Pub. Date: Aug. 16, 2012

(65) Prior Publication Data
US 2014/0166934 A1    Jun. 19, 2014

Related U.S. Application Data

(60) Provisional application No. 61/526,248, filed on Aug. 22, 2011, provisional application No. 61/525,708, (Continued)

(51) Int. Cl.
*F01K 13/00* (2006.01)
*C10J 3/57* (2006.01)
(Continued)

(52) U.S. Cl.
CPC ............. *F01K 13/006* (2013.01); *C01B 3/02* (2013.01); *C01B 3/342* (2013.01); *C01B 3/348* (2013.01);
(Continued)

(58) Field of Classification Search
CPC ............. C01B 3/00; C01B 2203/0861; C01B 2203/0255; C01B 3/348; C01B 3/342;
(Continued)

(56) References Cited

U.S. PATENT DOCUMENTS 3,056,847 A * 10/1962 Junker ..................... H05B 6/26
373/141
4,514,219 A    4/1985 de Saint Martin
(Continued)

FOREIGN PATENT DOCUMENTS

WO    WO 2008104088 A1 *    9/2008

OTHER PUBLICATIONS

Manfred Klein, Gas Turbine Developments and Contributions to Clean Energy Solutions, ETN Brussels, Oct. 2010, 16 pages.
(Continued)

*Primary Examiner* — Anthony J Zimmer
*Assistant Examiner* — Syed T Iqbal
(74) *Attorney, Agent, or Firm* — Dykema Gossett PLLC

(57) ABSTRACT

A method of generating syngas as a primary product from renewable feedstock, fossil fuels, or hazardous waste with the use of a cupola. The cupola operates selectably on inductive heat alone, chemically assisted heat, or plasma assisted heat. Additionally, the operation of the cupola is augmented by the use of direct acting carbon or graphite rods that carry electrical current for additional heat generation into the metal bath that is influenced by the inductive element. The method includes the steps of providing a cupola for containing a metal bath; and operating an inductive element to react with the metal bath. Feedstock in the form of a combination of fossil fuel, a hazardous waste, and a hazardous material is supplied to the cupola. A plasma torch operates on the metal bath selectably directly and
(Continued)

indirectly. Steam, air, oxygen enriched air, and oxygen are supplied in selectable combinations.

19 Claims, 4 Drawing Sheets

Related U.S. Application Data filed on Aug. 19, 2011, provisional application No. 61/463,022, filed on Feb. 10, 2011.

(51) Int. Cl.
| | |
|---|---|
| *C01B 3/34* | (2006.01) |
| *F23G 5/027* | (2006.01) |
| *F23G 5/08* | (2006.01) |
| *C01B 3/02* | (2006.01) |
| *F01K 7/16* | (2006.01) |
| *C21B 13/00* | (2006.01) |

(52) U.S. Cl.
CPC ............... *C10J 3/57* (2013.01); *F01K 7/16* (2013.01); *F23G 5/027* (2013.01); *F23G 5/085* (2013.01); *C01B 2203/0216* (2013.01); *C01B 2203/0255* (2013.01); *C01B 2203/0861* (2013.01); *C10J 2300/0946* (2013.01); *C10J 2300/0956* (2013.01); *C10J 2300/0959* (2013.01); *C10J 2300/0976* (2013.01); *C10J 2300/1238* (2013.01); *C10J 2300/1276* (2013.01); *C10J 2300/1675* (2013.01); *C21B 13/0073* (2013.01); *F23G 2202/20* (2013.01); *F23G 2204/201* (2013.01); *F23G 2204/204* (2013.01); *Y02E 20/12* (2013.01); *Y02E 20/34* (2013.01); *Y02P 10/32* (2015.11); *Y02P 20/129* (2015.11)

(58) Field of Classification Search
CPC . C01B 3/02; C01B 2203/0216; F01K 13/006; F01K 7/16; Y02P 10/32; Y02P 20/129; F23G 2204/204; F23G 2202/20; F23G 2204/201; F23G 5/027; F23G 5/085; Y02E 20/12; Y02E 20/18; Y02E 20/34; C10J 2300/0946; C10J 2300/0956; C10J 2300/0959; C10J 2300/0976; C10J 2300/1276; C10J 2300/1675; C10J 2300/1238; C10J 3/57; C21B 13/0073
USPC .................. 48/197 R; 252/373; 423/644
See application file for complete search history.

(56) References Cited

U.S. PATENT DOCUMENTS

| | | |
|---|---|---|
| 6,175,183 B1 | 1/2001 | Liehr |
| 6,372,156 B1 | 4/2002 | Kong et al. |
| 2009/0133407 A1 | 5/2009 | Sawyer |
| 2009/0224210 A1* | 9/2009 | Collins et al. ............ 252/373 |

OTHER PUBLICATIONS

Robert M. Jones, et al., GE Power Systems IGCC Gas Turbines for Refinery Applications, Mar. 2002, 19 pages.

* cited by examiner

INDUCTIVE BATH PLASMA CUPOLA

BACKGROUND OF THE INVENTION

Field of the Invention

This invention relates generally to a new and novel design for a cupola to generate a syngas. One of the main applications for the cupola is in the field of renewable power generation. The cupola can operate on an inductive metal bath heating system only or it can be assisted by a plasma torch system.

Description of the Related Art

Inductive heating furnaces have existed for some time. They have been applied to the purpose of processing metals and ores. The furnaces have been optimized in many ways for this process including trunion tilting methods and special ore charging systems. The furnaces have proven to be robust in the metal processing industry.

In an unrelated industry, plasma has been utilized to process renewable feedstocks, fossil fuels, and hazardous materials for the purpose of producing syngas as a primary product. This process, which includes plasma gasification, continues to grow in popularity. To date, however, the plasma heat source has been supplemented in a gassifier chamber or cupola with additives such as coke that is loosely combined with the controlled injection of air or oxygen to combust grossly existing syngas in the plasma chamber. However, emissions regulations have been tightened concurrently with an increase in the cost of electricity needed to operate the plasma torch. Unfortunately plasma torches have very narrowly directed heat energy that reflects easily off of targets and ultimately escapes from the cupola. The addition of additives such as coke help to confine the plasma heat, but disadvantageously causes increases in emissions and operating costs.

It is, therefore, an object of this invention to reduce both, emissions from the operation of a cupola syngas plant and the amount of electricity needed to operate a syngas cupola system.

It is also an object of this invention to integrate an inductive heating system into a cupola for the purpose of producing syngas, with optional plasma torch assistance.

It is another object of this invention to apply inductive technology that has conventionally been used in the production of metals and alloys, to the production of syngas.

SUMMARY OF THE INVENTION

The foregoing and other objects are achieved by this invention which provides, in accordance with a method aspect thereof, a method of producing heat via an inductive heating element exciting and heating a metal bath in a cupola. The metal bath can be used to produce syngas alone as a heat source or it can be supplemented by a plasma torch system. The cupola can be used to process renewable feedstocks, fossil fuels, and hazardous materials. The heat required to produce syngas can be supplemented by injection of air, oxygen enriched air, or oxygen into the cupola. The syngas process can also be supplemented by the injection of steam to the cupola.

In accordance with a first method aspect of the invention, there is provided a method of producing syngas, having the steps of:
providing a cupola for containing a metal bath; and
operating an inductive element to react with the metal bath.

In one embodiment of this first method aspect of the invention, there is provided the further step of delivering a feedstock to the cupola. In respective embodiments, the feedstock is a fossil fuel, and can constitute a selectable combination of a hazardous waste, any organic compound, any fossil fuel, and a hazardous material.

In a further embodiment, there is provided the further step of supplementing the step of operating an inductive element by the further step of operating a plasma torch. In one embodiment, the step of operating a plasma torch is performed to operate on the metal bath selectably directly and indirectly.

In an embodiment of the invention where the plasma is applied indirectly, the torch is placed to form a down draft application at the top of the cupola so as to help reduce particulate and emissions in the syngas. In such an embodiment, the torch operates essentially in parallel with an inductive furnace. In other embodiments, the torch is placed in a down draft application at an angle to cause the syngas to tumble and thereby enhance mixing of the components in the product syngas.

In further embodiments, there is provided the further step of supplementing the step of operating an inductive element by the further step of injecting steam to enhance the production of syngas. Such supplementation can, in some embodiments, include the further step of injecting a selectable one of air, oxygen enriched air, and oxygen.

In accordance with a second method aspect of the invention, there is provided a method of producing syngas, the method including the steps of:
providing a cupola for containing a metal bath;
operating an inductive element to react with the metal bath; and
supplementing the step of operating an inductive element by the further step of operating a plasma torch.

In one embodiment of this second method aspect of the invention, the step of operating a plasma torch is performed to operate on the metal bath selectably directly and indirectly. In a further embodiment, there is further provided the step of supplementing the step of operating an inductive element by the further step of adding chemical heat. Supplementation is also achieved, in some embodiments, by the further step of injecting steam to enhance the production of syngas, and in other embodiments, by the further step of injecting a selectable one of air, oxygen enriched air, and oxygen.

In accordance with a third method aspect of the invention, there is provided a method of producing syngas, the method including the steps of:
providing a cupola for containing a metal bath;
operating an inductive element to react with the metal bath; and
supplementing the step of operating an inductive element by the further step of propagating a selectable one of plasma and electricity into the metal bath to supplement heating of the cupola by the step of operating an inductive element.

In one embodiment of this third method aspect of the invention, there is provided the further step of supplementing the step of operating an inductive element by the further step of operating a plasma torch. The operation of the plasma torch is performed to operate on the metal bath selectably directly and indirectly. In some embodiments, there is provided the further step of supplementing the step of operating an inductive element by the further step of injecting steam to enhance the production of syngas. In further embodiments, the step of supplementing includes the step of injecting a selectable one of air, oxygen enriched air, and oxygen.

BRIEF DESCRIPTION OF THE DRAWING

Comprehension of the invention is facilitated by reading the following detailed description, in conjunction with the annexed drawing, in which.

DETAILED DESCRIPTION

Figure 1:
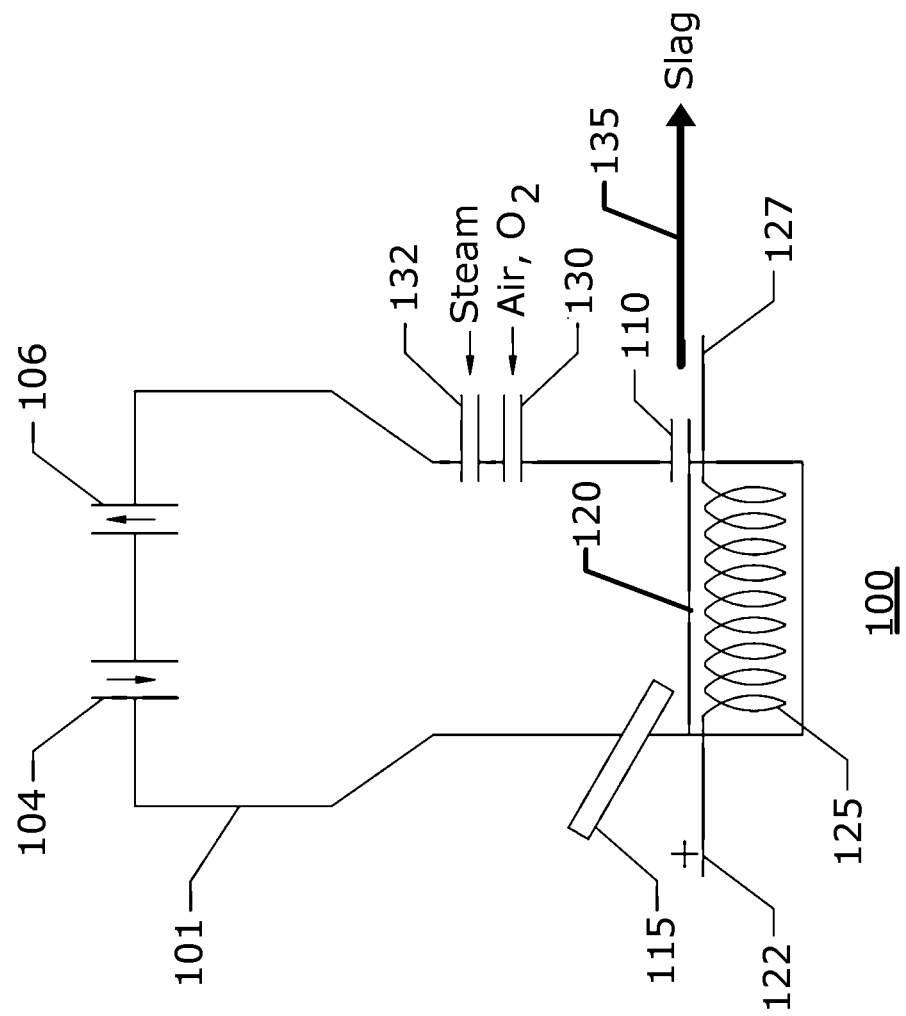
FIG. 1 is a simplified schematic representation of a cupola arrangement constructed in accordance with the invention.

FIG. 1 is a simplified schematic representation of a cupola arrangement 100 constructed in accordance with the invention. As shown in this figure, a cupola shell 101 is provided with an inlet 104 for introducing a feedstock (not shown) that in some embodiments of the invention is a renewable feedstock, a fossil fuel, or a hazardous waste (not shown). Any combination of the three forms of feedstock can be used in the practice of the invention. There is additionally provided in an outlet port 106 for enabling removal of the generated syngas (not shown). In contrast to conventional inductive furnaces that facilitate a large outlet for metal or alloy production, there is no other outlet for such product. There is but an additional small drain 110 for eliminating inorganic slag.

It is a feature of the present invention that primarily organic compounds are processed to produce syngas. The specific illustrative embodiment of the invention described herein is essentially a bucket arrangement wherein an indirect electrical arc services a non-transfer inductive furnace. This is distinguishable from the conventional use of an inductive furnace, which is to make metals and alloys.

Figure 3:
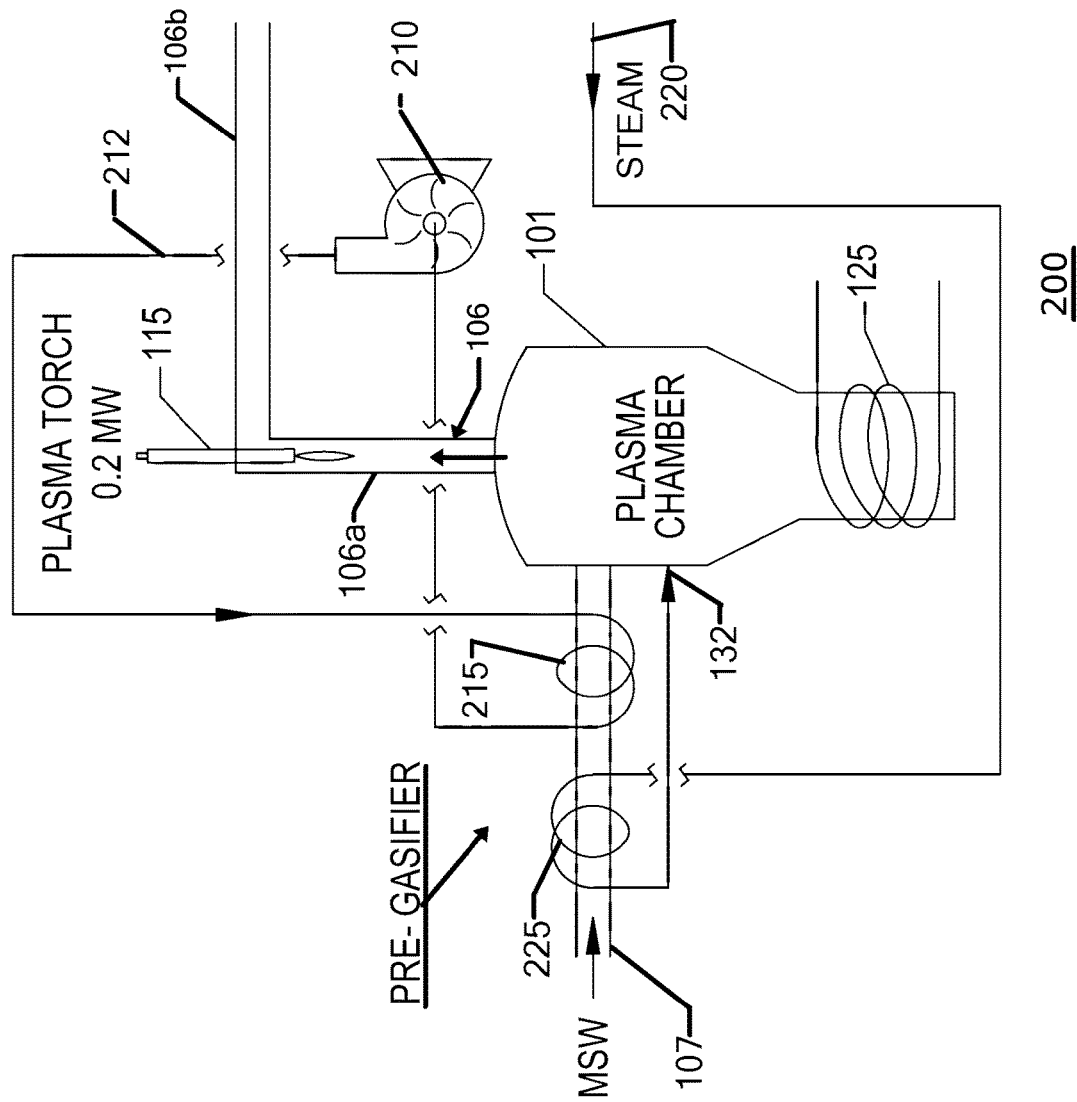
FIG. 3 is a simplified schematic representation showing an indirect application of a plasma torch on an inductive metal bath and the cupola.
Figure 4:
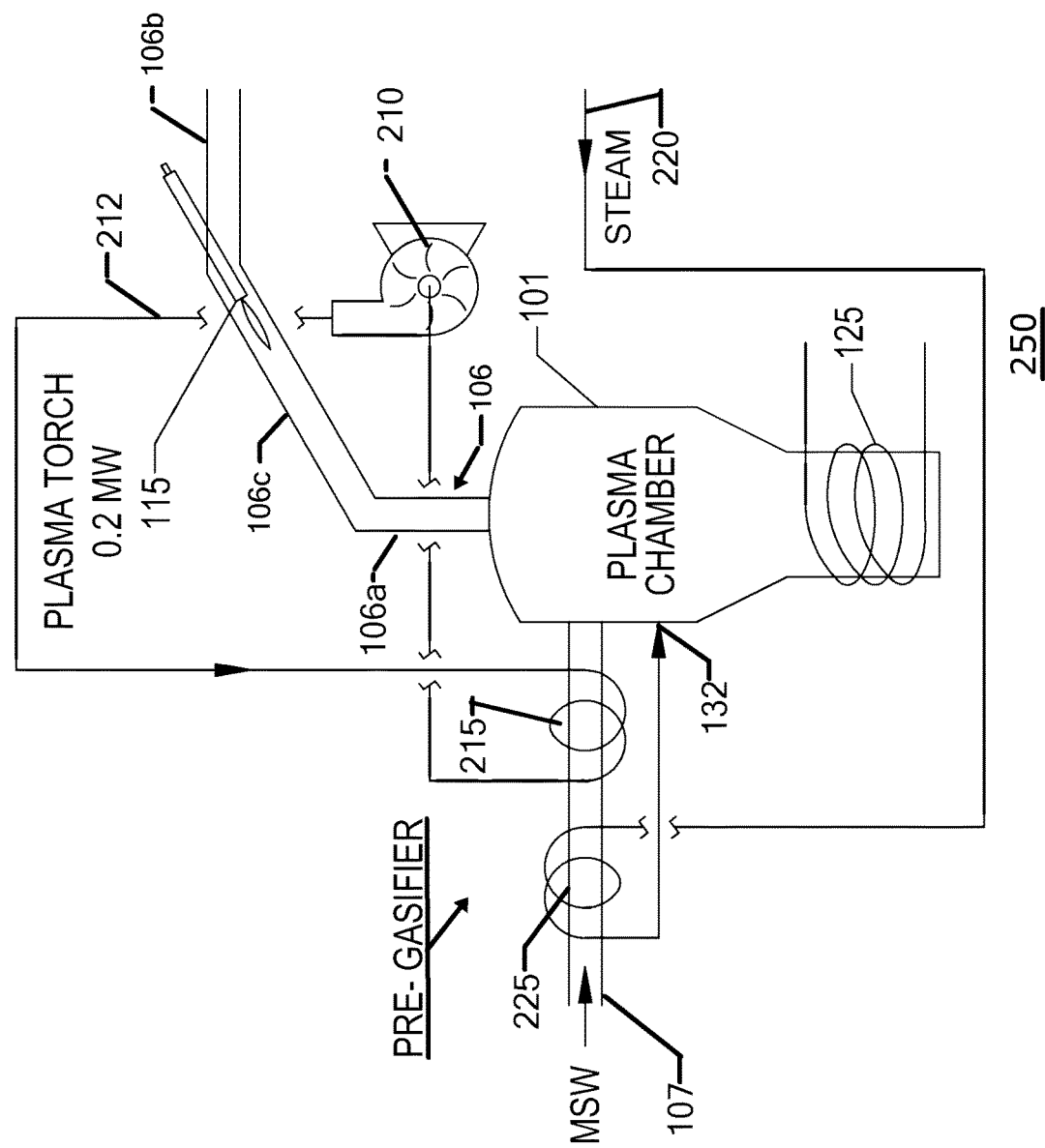
FIG. 4 is a simplified schematic representation showing a second indirect application of a plasma torch disposed at an angle relative to the cupola.

FIG. 1 further shows cupola arrangement 100 to have a direct acting plasma torch 115, which in some embodiments of the invention, as will be described below in relation to FIGS. 3, and 4, is an indirect acting plasma torch, to assist in the cupola heating process. In other embodiments, plasma torch 115 is a carbon or graphite rod that is used to conduct AC or DC electrical energy into a metal bath 120. The return path for the electrical energy has been omitted from this figure for sake of clarity.

There is provided in this specific illustrative embodiment of the invention a cathode 122 that is coupled electrically to an inductive element 125. Additionally, inductive element 125 has associated therewith an anode 127.

Air, oxygen enriched air, or oxygen are injected into cupola arrangement 100 via an inlet 130 to assist in the generation of heat using chemical energy and steam that is delivered via an inlet 132. The chemical energy and steam are injected for the further purpose of assisting in the generation of syngas. The process of the present invention can, in some embodiments, be performed in a pyrolysis, or air starved, mode of operation.

Figure 2:
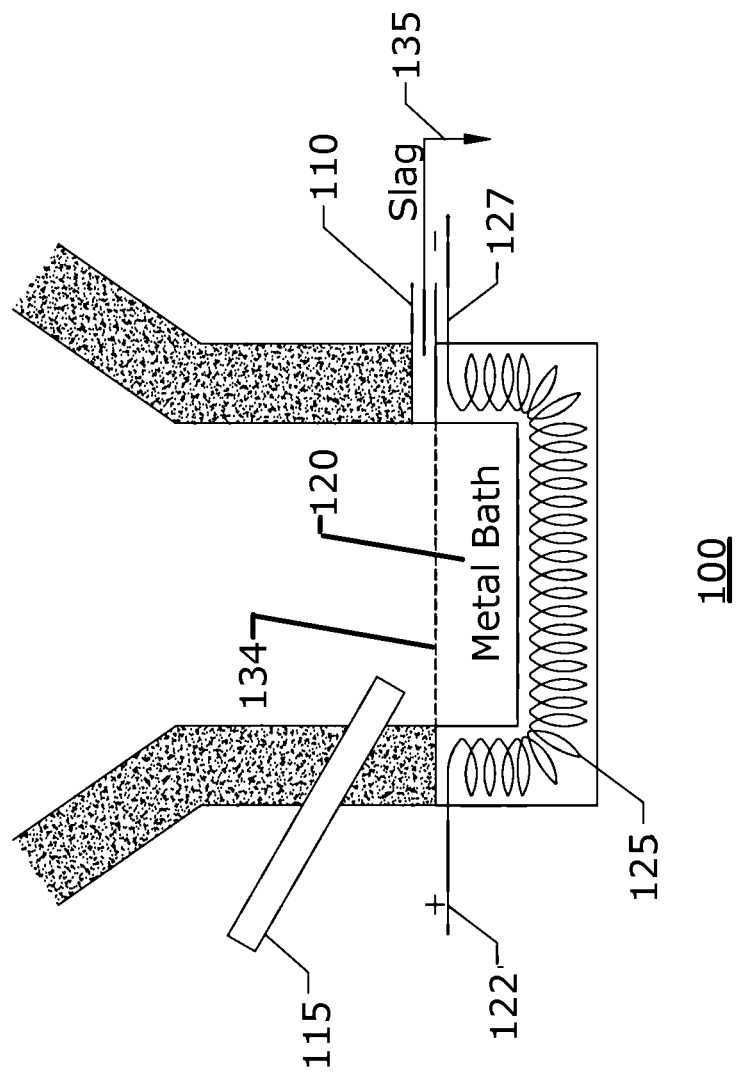
FIG. 2 is a simplified schematic representation showing in greater detail a lower portion of the cupola of FIG. 1.

FIG. 2 is a simplified schematic representation showing in greater detail a lower portion of cupola arrangement 100 of FIG. 1. Elements of structure that have previously been discussed are similarly designated. Inductive element 125 reacts on metal bath 120. Metal bath 120 can consist of any metal or alloy such as aluminum for low temperature work or titanium for high temperature work. Metal bath 120 is kept at a constant fill level 134 by operation of slag drain 110 through which a slag product 135 is drained.

FIG. 3 is a simplified schematic representation showing a cupola arrangement 200, wherein there is illustrated an indirect application of a plasma torch 115 on an inductive metal bath and the cupola for enhancing the heating process. In this specific illustrative embodiment of the invention, plasma torch 115 has a power capacity of 0.2 MW. Elements of structure that have previously been discussed are similarly designated. As shown in this figure, syngas outlet 106 is lengthened in this specific illustrative embodiment of the invention, and is shown to have vertical and horizontal portions, 106a and 106b, respectively. Indirectly acting plasma torch 115 is, in this embodiment, inserted in the end of vertical section 106a. In this specific illustrative embodiment of the invention, syngas outlet 106 is refractory-lined and insulated (not shown).

In the embodiment of FIG. 3, there is shown an inlet 107 via which is provided municipal solid waste (MSW) (not specifically designated) as a feedstock. Of course, other types of feedstock, as hereinabove noted, can be used in the practice of the invention.

The product syngas in this embodiment is forced to exit into vertical section 106a where it communicates with the high temperature plume (not specifically designated) and the radiant heat that is issued by plasma torch 115. The syngas and syngas outlet 106 both are heated by operation of plasma torch 115. In this specific illustrative embodiment of the invention, the heated horizontal portion 106b of syngas outlet 106 is subjected to a heat extraction arrangement that delivers the heat to inlet 107 for the purpose of pre-gasifying the MSW feedstock. The heat extraction arrangement is formed by an impeller 210 that urges a fluid (not shown) along a fluid loop that includes a region 212 where the fluid is heated by communication with heated horizontal portion 106b of syngas outlet 106. The heated fluid then is propagated to a heat exchanger 215 where a portion of the heat therein is transferred to the incoming MSW feedstock that is being delivered at inlet 107.

There is additionally shown in this figure a steam inlet 132, as hereinabove described. However, the steam is shown in this figure to be supplied by a steam supply 220, and the steam then is conducted to a further heat exchanger 225 where a portion of the heat in the steam is transferred to the incoming MSW feedstock that is being delivered at inlet 107. Heat exchangers 215 and 225 thereby constitute a pre-gassifier for the MSW feedstock, whereby the production of syngas is enhanced.

FIG. 4 is a simplified schematic representation of a cupola arrangement 250 showing a second indirect application of a plasma torch that is disposed at an angle relative to the cupola. Elements of structure that have previously been discussed are similarly designated. As shown in this figure, the outlet port 106 is fabricated in part at an angle that in some embodiments is greater than 90° to induce tumbling and mixing in the product syngas (not shown). Thus, in addition to vertical and horizontal portions, 106a and 106b, respectively, there is shown in this specific illustrative embodiment of the invention an angular portion 106c. Plasma torch 115 is shown to be inserted in angular portion 106c.

Although the invention has been described in terms of specific embodiments and applications, persons skilled in the art may, in light of this teaching, generate additional embodiments without exceeding the scope or departing from the spirit of the invention described and claimed herein. Accordingly, it is to be understood that the drawing and description in this disclosure are proffered to facilitate comprehension of the invention, and should not be construed to limit the scope thereof.

What is claimed is:

1. A method of producing syngas by converting a feedstock in a chamber to syngas by the application of heat, the chamber having an inlet for feedstock and an outlet for syngas, the method comprising the steps of:
   providing said chamber in the form of a cupola containing a metal bath, wherein
   an inductive element at least partially surrounds the metal bath;
   operating the inductive element to react with a metal or metal alloy in the metal bath to melt the metal or metal alloy, the heat from the metal bath providing the heat to convert the feedstock to syngas;
   operating a first plasma torch in an exit section exterior to the chamber to heat the syngas after it exits the chamber; and
   removing a slag product from said chamber through a slag drain, wherein the slag drain is disposed at the top of the metal bath and is configured to keep the metal bath at a constant fill level.

2. The method of claim 1, wherein there is provided the further step of delivering a feedstock to the cupola.

3. The method of claim 2, wherein the feedstock is a fossil fuel.

4. The method of claim 2, wherein the feedstock is a hazardous waste.

5. The method of claim 2, wherein the feedstock is a combination of any organic compound, fossil fuel, and hazardous material.

6. The method of claim 1, wherein there is provided the further step of supplementing said step of operating an inductive element by the further step of operating a second plasma torch.

7. The method of claim 6, wherein said step of operating the second plasma torch is performed to operate on the metal bath selectably directly and indirectly.

8. The method of claim 1, wherein there is provided the further step of supplementing said step of operating an inductive element by the further step of injecting steam into the cupola to enhance the production of syngas.

9. The method of claim 1, wherein there is provided the further step of supplementing said step of operating an inductive element by the further step of injecting a selectable one of air, oxygen enriched air, and oxygen into the cupola.

10. A method of producing syngas by converting a feedstock in a chamber to syngas by the application of heat, the chamber having an inlet for feedstock and an outlet for syngas, the method comprising the steps of:
    providing said chamber in the form of a cupola containing a metal bath; and
    operating an inductive element to react with a metal or metal alloy in the metal bath to melt the metal or metal alloy, wherein the inductive element at least partially surrounds the metal bath, and wherein the heat from the metal bath provides the heat to convert the feedstock to syngas;
    supplementing said step of operating an inductive element by the further step of operating a first plasma torch, wherein the first plasma torch is configured to direct energy into the metal bath;
    operating a second plasma torch in an exit section exterior to the chamber to heat the syngas after it exits the chamber; and
    removing a slag product from said chamber through a slag drain, wherein the slag drain is disposed at the top of the metal bath and is configured to keep the metal bath at a constant fill level.

11. The method of claim 10, wherein said step of operating a first plasma torch is performed to operate on the metal bath selectably directly and indirectly.

12. The method of claim 10, wherein there is further provided the step of supplementing said step of operating an inductive element by the further step of adding chemical heat.

13. The method of claim 10, wherein there is further provided the step of supplementing said step of operating an inductive element by the further step of injecting steam to enhance the production of syngas.

14. The method of claim 10, wherein there is further provided the step of supplementing said step of operating an inductive element by the further step of injecting a selectable one of air, oxygen enriched air, and oxygen.

15. A method of producing syngas by converting a feedstock in a chamber to syngas by the application of heat, the chamber having an inlet for feedstock and an outlet for syngas, the method comprising the steps of:
    providing said chamber in the form of a cupola containing a metal bath; and
    operating an inductive element to react with a metal or metal alloy in the metal bath to melt the metal or metal alloy, wherein the inductive element at least partially surrounds the metal bath, and wherein the heat from the metal bath provides the heat to convert the feedstock to syngas;
    supplementing' said step of operating an inductive element by the further step of propagating a selectable one of a first plasma torch and electricity into the metal bath to supplement heating of the cupola, wherein the selectable one of the first plasma torch and electricity is configured to direct energy into the metal bath;
    operating a second plasma torch in an exit section exterior to the chamber to heat the syngas after it exits the chamber; and
    removing a slag product from said chamber through a slag drain, wherein the slag drain is disposed at the top of the metal bath and is configured to keep the metal bath at a constant fill level.

16. The method of claim 15, wherein said step of operating a first plasma torch is performed to operate on the metal bath selectably directly and indirectly.

17. The method of claim 15, wherein there is provided the further step of supplementing said step of operating an inductive element by the further step of injecting steam into the cupola to enhance the production of syngas.

18. The method of claim 15, wherein there is provided the further step of supplementing said step of operating an inductive element by the further step of injecting a selectable one of air, oxygen enriched air, and oxygen into the cupola.

19. The method of claim 15, wherein there is provided the further step of supplementing said step of operating an inductive element by the further step of conducting electrical energy via a conductive rod formed of a selectable one of graphite and carbon into the metal bath.

* * * * *